US011998775B2

(12) United States Patent
Salter et al.

(10) Patent No.: US 11,998,775 B2
(45) Date of Patent: Jun. 4, 2024

(54) VEHICLE WINDOW BREAKER TOOL AND ALERT

(71) Applicant: Ford Global Technologies, LLC, Dearborn, MI (US)

(72) Inventors: Stuart C. Salter, White Lake, MI (US); Mark Roseman, Southfield, MI (US); Jeff Robert Seaman, Brownstown, MI (US); David Brian Glickman, Southfield, MI (US); Annette Lynn Huebner, Highland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 438 days.

(21) Appl. No.: 17/479,102

(22) Filed: Sep. 20, 2021

(65) Prior Publication Data
US 2023/0089364 A1 Mar. 23, 2023

(51) Int. Cl.
*A62B 3/00* (2006.01)
*B60R 22/32* (2006.01)
*B60W 40/02* (2006.01)
*B60W 50/14* (2020.01)
*F21V 33/00* (2006.01)
(Continued)

(52) U.S. Cl.
CPC .............. *A62B 3/005* (2013.01); *B60R 22/32* (2013.01); *B60W 40/02* (2013.01); *B60W 50/14* (2013.01); *F21V 33/0084* (2013.01); *G01S 5/04* (2013.01); *G08B 25/10* (2013.01); *H04B 1/38* (2013.01); *B60R 2022/328* (2013.01); *B60W 2050/143* (2013.01)

(58) Field of Classification Search
CPC . A62B 3/0005; B60R 22/32; B60R 2022/328; B60W 40/02; B60W 50/14; B60W 2050/123; F21V 33/0084; G01S 5/04; G08B 25/10; H04B 1/38
USPC .............................................. 7/144
See application file for complete search history.

(56) References Cited

U.S. PATENT DOCUMENTS 8,015,643 B2 9/2011 White
8,727,060 B1 * 5/2014 Erickson ................. B60R 21/00
 30/367

(Continued)

FOREIGN PATENT DOCUMENTS

CN 112124052 A 12/2020
KR 101891661 B1 8/2018

*Primary Examiner* — Hadi Shakeri
(74) *Attorney, Agent, or Firm* — Vichit Chea; Price Heneveld LLP

(57) ABSTRACT

A window breaker tool for use on a vehicle includes a body having a handle to enable a user to grip the tool, a glass breaker member extending from the handle configured to contact a glass window with force to break the glass window, and an accelerometer operatively coupled to the body to sense acceleration during impact and generate a signature signal. The tool also includes an RF signal communication device located on the tool for communicating with a plurality of RF signal communication devices on the vehicle to determine a location of the tool relative to the vehicle, wherein the RF signal communication device communicates with a controller for processing the signature signal and determining whether the signature signal is indicative of the tool in use to break a window, and wherein the controller further determines the tool is within the vehicle based on the location and outputs an alert signal.

17 Claims, 7 Drawing Sheets

(51) Int. Cl.
  *G01S 5/04*  (2006.01)
  *G08B 25/10*  (2006.01)
  *H04B 1/38*  (2015.01)

(56) References Cited

U.S. PATENT DOCUMENTS

| | | | |
|---|---|---|---|
| 8,869,927 B2* | 10/2014 | Oosterhuis | B60J 1/20 |
| | | | 180/274 |
| 9,894,492 B1 | 2/2018 | Elangovan et al. | |
| 10,189,152 B2 | 1/2019 | Franken | |
| 10,668,847 B2 | 6/2020 | Takenaka et al. | |
| 10,928,239 B1* | 2/2021 | Salter | B60W 40/06 |
| 2014/0157525 A1* | 6/2014 | Locklear | B60R 22/32 |
| | | | 7/158 |
| 2015/0213555 A1* | 7/2015 | Barfield, Jr. | H04W 4/48 |
| | | | 705/4 |
| 2020/0373957 A1 | 11/2020 | Sharinn et al. | |
| 2021/0146848 A1 | 5/2021 | Saito et al. | |

* cited by examiner

VEHICLE WINDOW BREAKER TOOL AND ALERT

FIELD OF THE DISCLOSURE

The present disclosure generally relates to a hammer tool, and more particularly relates to a hammer tool for use on a vehicle to break glass and provide an alert.

BACKGROUND OF THE DISCLOSURE

Safety or escape hammers are known for use on a vehicle to break glass on a window to allow egress from the vehicle. The hammer may include a cutter for cutting seat belt material. In the event of a need to break out of the vehicle, the hammer may be employed to break the glass window. It is desirable to provide for a hammer tool that further provides an alert signal in a manner that avoids false alarms.

SUMMARY OF THE DISCLOSURE

According to a first aspect of the present disclosure, a window breaker tool for use on a vehicle is provided. The tool includes a body having a handle to enable a user to grip the tool, a glass breaker member extending from the handle configured to contact a glass window with force to break the glass window, and an accelerometer operatively coupled to the body to sense acceleration during impact and generate a signature signal. The tool also includes an RF signal communication device located on the tool for communicating with a plurality of RF signal communication devices on the vehicle to determine a location of the tool relative to the vehicle, wherein the RF signal communication device communicates with a controller for processing the signature signal and determining whether the signature signal is indicative of the tool in use to break a window, wherein the controller further determines the tool is within the vehicle based on the location and outputs an alert signal.

Embodiments of the first aspect of the disclosure can include any one or a combination of the following features:
- the controller is located on the vehicle;
- the RF signal communication device comprises an RF transmitter and wherein the plurality of RF signal communication device on the vehicle comprise RF receivers, and wherein the controller processes the signals received with the RF receivers and determines the location of the tool based on the received RF signals;
- the tool further comprises a battery;
- the tool further comprises a lighting device, wherein the lighting device is illuminated when the controller determines that the vehicle is located in a body of water;
- the body of water is determined based on a water sensor provided on the vehicle;
- the water sensor comprises one or more capacitive sensors;
- the tool is attached to an assist handle on the vehicle;
- the tool has a first connector at a first end and a second connector at a second end, wherein the first and second connectors are configured to releasably connect to supporting portions of the assist handle;
- the handle serves as the assist handle;
- the alert signal is transmitted to a service center; and
- the tool further comprises a cutter.

According to a second aspect of the present disclosure, a window breaker tool for use on a vehicle is provided. The tool includes a body having a handle to enable a user to grip the tool, a glass breaker member extending from the handle configured to contact a glass window with force to break the glass window, and an accelerometer operatively coupled to the body to sense acceleration during impact and generate a signature signal. The tool also includes an RF signal communication device located on the tool for communicating with a plurality of RF signal communication devices on a vehicle to determine a location of the tool relative to the vehicle, wherein the RF signal communication device communicates with a controller for processing the signature signal and determining whether the signature signal is indicative of the tool in use to break a window, wherein the controller further determines the tool is within the vehicle and outputs an alarm signal when the tool is in use in the vehicle and the vehicle is determined to be in a body of water.

Embodiments of the second aspect of the disclosure can include any one or a combination of the following features:
- the controller is located on the vehicle;
- the RF signal communication device comprises an RF transmitter and wherein the plurality of RF signal communication device on the vehicle comprise RF receivers, and wherein the controller processes the signals received with the RF receivers and determines the location of the tool based on the received RF signals;
- the tool further comprises a battery;
- the body of water is determined based on a water sensor provided on the vehicle;
- the tool further comprises a lighting device, wherein the lighting device is illuminated when the controller determines that the vehicle is located in the body of water;
- the tool further comprises a cutter; and
- the tool is stowable on an assist handle of the vehicle and the handle services as a handle for the assist handle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
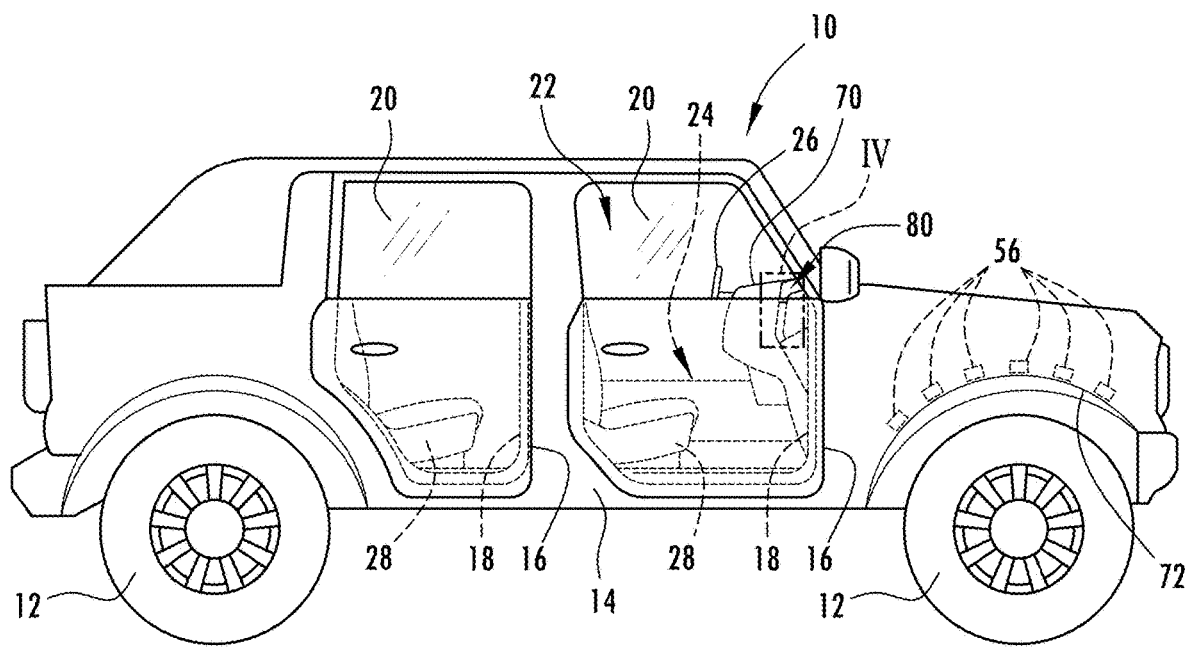
FIG. 1 is a side perspective view of a motor vehicle that is configured to include one or more assist handle assemblies having a window breaker hammer tool.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to vehicle glass breaker hammer tool. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 2:
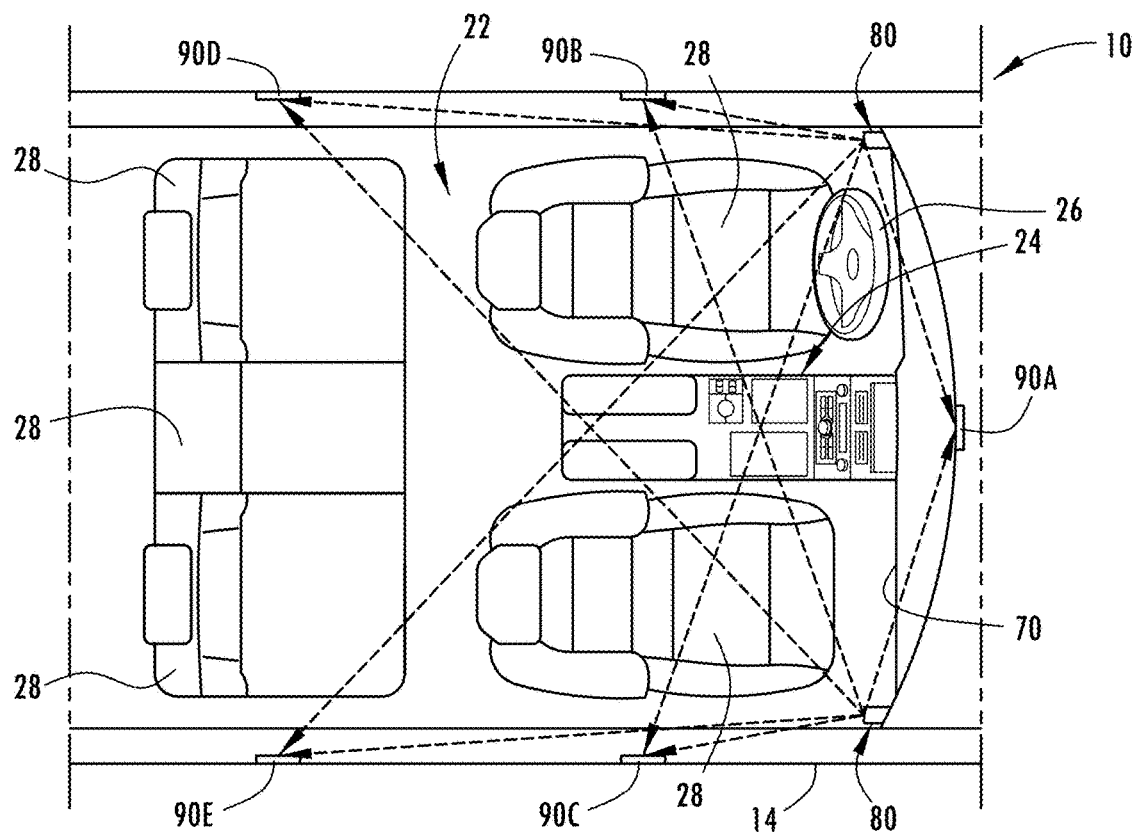
FIG. 2 is a top view of the cabin interior of the vehicle equipped with RF signal communication devices for communicating with the hammer tool.

Referring to FIGS. 1 and 2, a motor vehicle 10 is generally illustrated according to one example. The motor vehicle 10 is generally shown as an off-road styled wheeled motor vehicle that may be driven on a roadway or off-road on various types of terrain. The motor vehicle 10 generally includes a plurality of road wheel and tire assemblies 12 and a vehicle body 14 generally defining a cabin interior 22. A plurality of doors 16 are hingedly connected to the vehicle body 14 to control ingress/egress to the cabin interior 22 via openings 18. The doors 16 may each include one or more windows 20 that may open and close or may be fixed to the door 16. The windows 20 are made of a transparent material, such as glass, that allows transparent viewing. While a wheeled vehicle 10 is generally shown and described herein, it should be appreciated that other vehicles, such as boats, trains, planes and other vehicles may be equipped with a window breaker hammer tool as described herein.

The motor vehicle 10 is configured to include one or more seats 28 for holding passengers seated within the passenger or cabin interior 22 of the vehicle 10. In a typical passenger vehicle seating arrangement, a front row of bucket sets may include two seats spaced apart and a second row having a bench seat configuration that may include a row of three seats or may include two seats separated by a rear center console. The front row seats are generally rearward of a dashboard 70. A front center console 24 is shown located centrally within the front row of seats between a driver seat which is rearward of a steering wheel 26 and a passenger seat. The center console 24 may be configured with storage compartments, drink holders, and other features. One or more assist handle assemblies 80 are shown connected to the dashboard 70 generally forward of the front row of seats. More specifically, the assist handle assemblies 80 may be located at or near the A-pillars of the vehicle 10 on opposite lateral sides of the vehicle body 14.

The motor vehicle 10 is shown further including one or more water sensors 56, which may be configured as capacitive proximity sensors. In the example shown, a series of six proximity sensors are located within a wheel well 72 of the vehicle body 14. The six proximity sensors operate as water level sensors 56 to sense the level or height of water relative to the vehicle 10. The proximity sensors may generate a capacitive signal that is influenced by the water to indicate whether water exists at that level of the sensor. As such, by utilizing one or more proximity sensors, the water level may be measured and used to determine whether to generate an alert signal output.

Assist handle assemblies 80 are shown in one example assembled onto a driver side of the dashboard 70 and also onto a passenger side of the dashboard 70. Each assist handle assembly 80 enables a driver or passenger seated on a corresponding seat 28 to engage and grip the assist handle assembly 80 with a hand for support while entering the vehicle and while traveling in the vehicle 10. For example, when the vehicle 10 is traveling on rough terrain, such as off-road, a passenger seated in a seat 28 may grip the assist handle assembly 80 for purposes of maintaining balance and stability. While the assist handle assemblies 80 are shown located on the left and right sides of the front row of seating, it should be appreciated that assist handle assemblies 80 may likewise be located on proximate to seat assemblies in the second or rearward rows of seating or may otherwise be located on or near the center console assembly 24.

Figure 4:
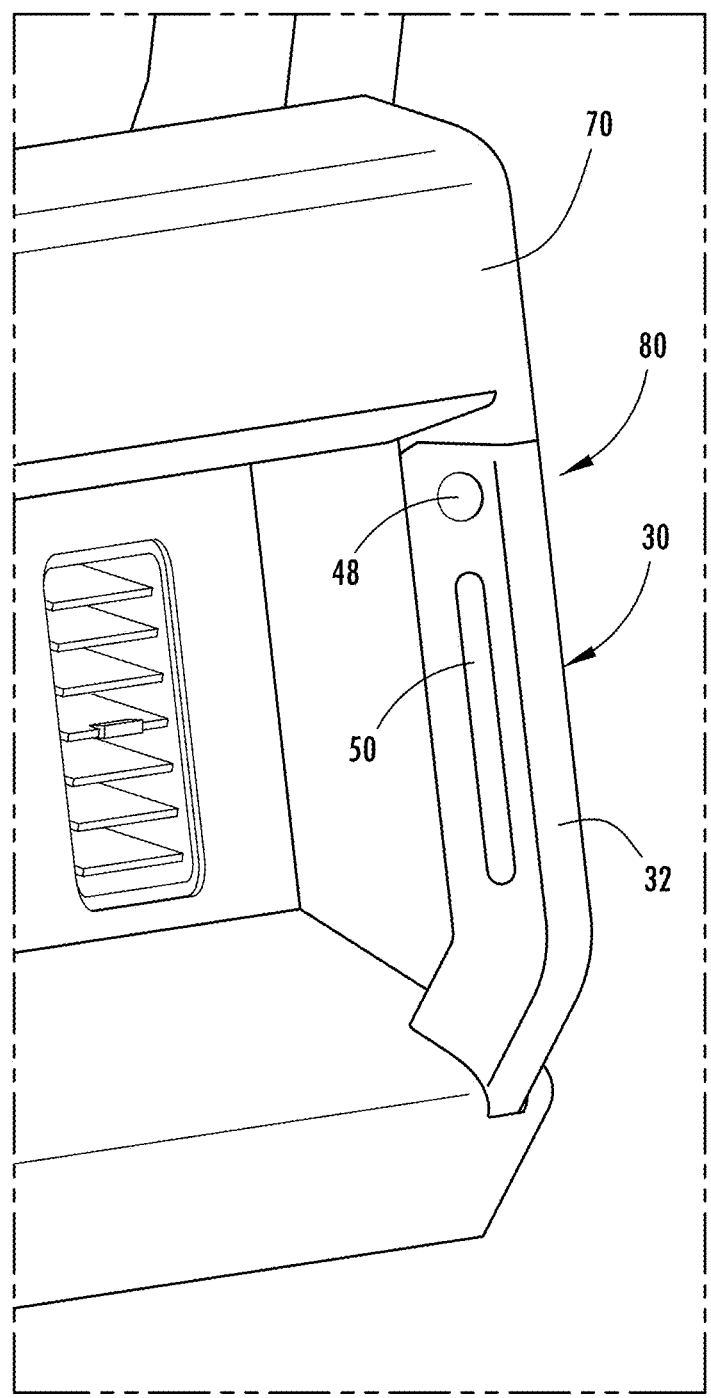
FIG. 4 is a side view of the handle assembly and the hammer tool shown in FIG. 1.
Figure 5:
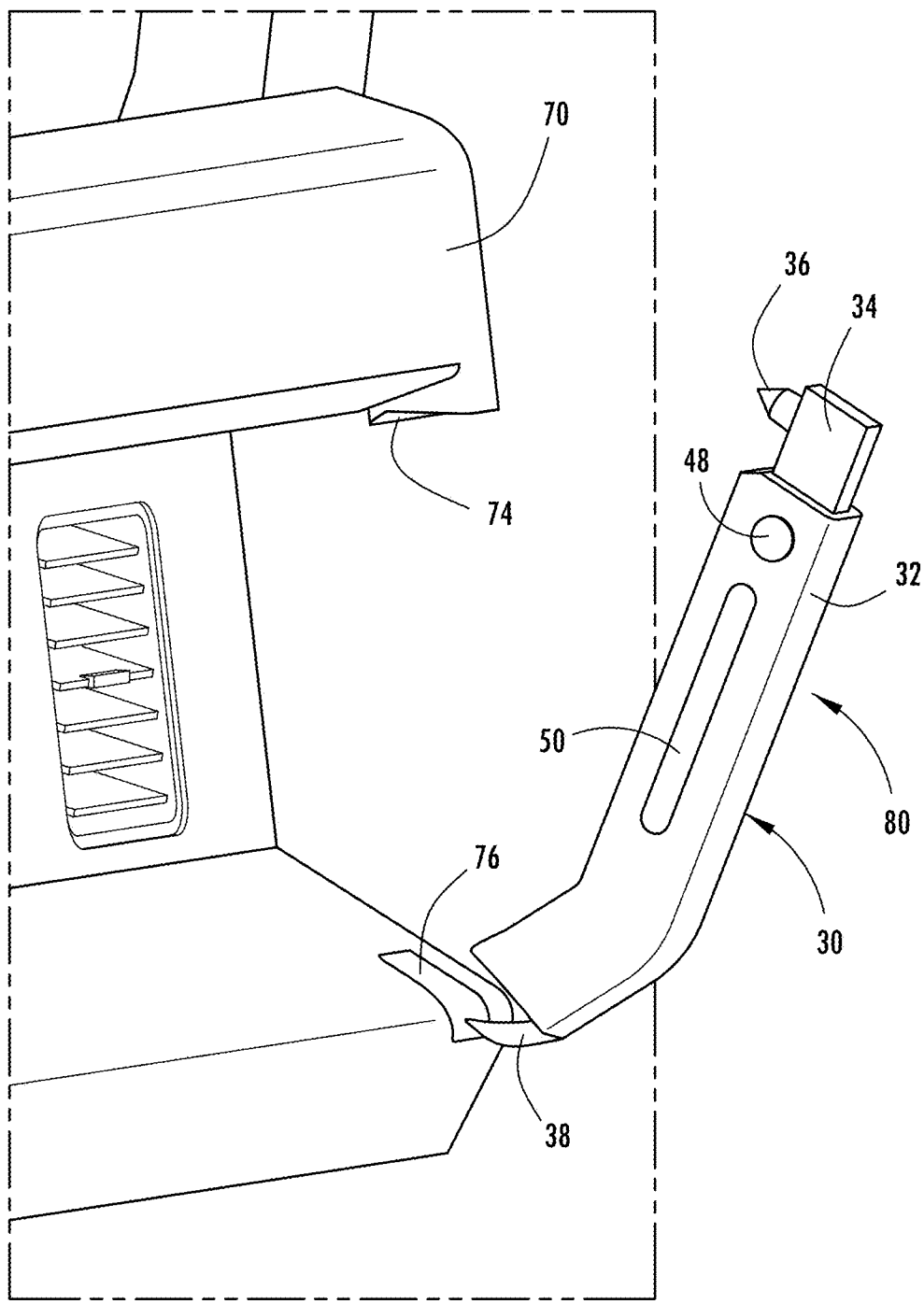
FIG. 5 is a side view of the handle assembly and the hammer tool illustrated in a partially removed position.

The assist handle assembly 80 is further illustrated in FIGS. 4 and 5 having a first end with an upper hammer head 32 connected to an upper connector 74 in the dashboard 70 and a second end with a cutter 38 connected to a lower connector 76 in the dashboard 70. The assist handle assembly 80 further includes a detachable hammer tool 30 that forms a handle portion of the assist handle assembly 80. The hammer tool 30 is installed and connected to the upper connector 74 and lower connector 76. The upper and lower connectors 74 and 76 may be releasable connectors such as a releasable pivoting mechanism at one end and a locking member at the other end that can be released by depressing button 48 and twisting the tool 30 inboard or inboard and upwards relative to the vehicle 10. The detachable hammer tool 30 includes a handle body 32 that enables a user to grip the handle body 32 for use as an assist handle. The detachable hammer tool 30 employs the hammer head 34 at the upper end for engaging the upper connector 74 and the cutter 38 at the lower end for engaging the lower connector 76. The detachable hammer tool 30 includes a release button 48 that enables a user to actuate the button 48 or depress the button 48 so as to release the hammer head 32 from the upper connector 72 and allow the hammer tool 30 to pivot out about lower connector 76 and be removed from the assist handle assembly 80.

Figure 6:
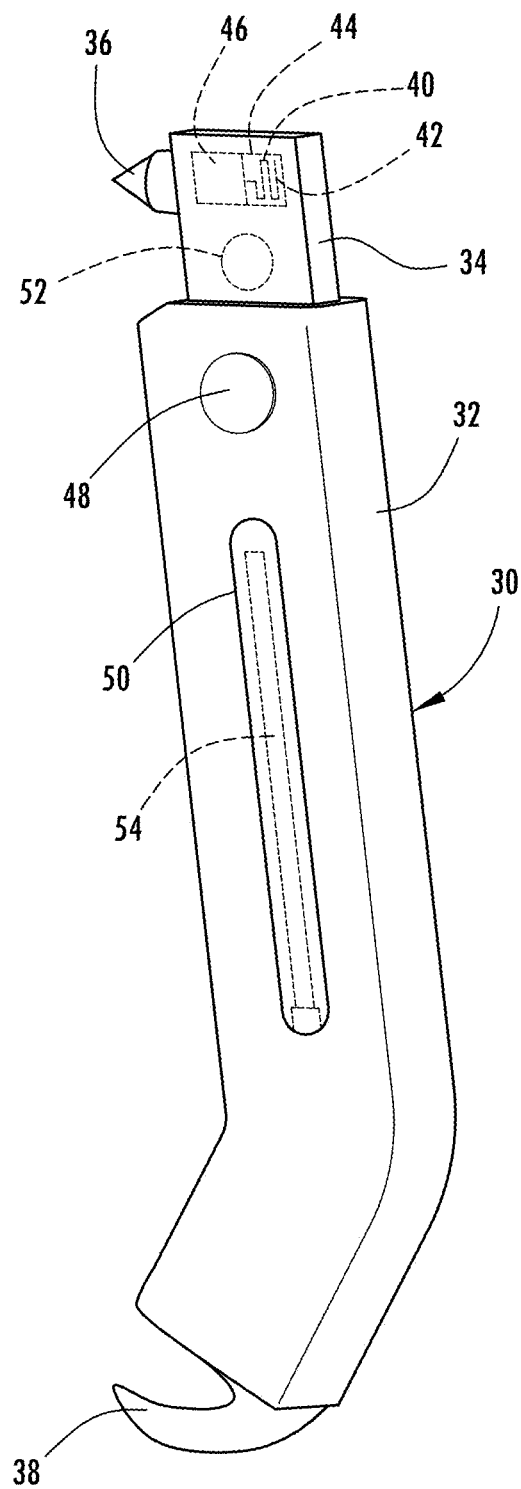
FIG. 6 is an enlarged view of the handle assembly and the hammer tool fully removed from the handle assembly.

The detachable hammer tool 30 is shown fully detached from the assist handle assembly 80 in FIG. 6. The detachable hammer tool 30 includes the handle body 32 defining a grippable portion that enables a user to grip the handle and to use the hammer tool 30 as a hammer to impact and break a glass window to enable one or more passengers to exit the vehicle 10. For example, if the vehicle 10 enters a body of water, the vehicle will typically float for a period of time, but it may be difficult for a user to open a door 16 of the vehicle 10 due to pressure applied to the door by the body of water. In the event of a vehicle water entry scenario, a user may be enabled to utilize the detachable hammer tool 30 to break a window on the vehicle 10 to exit the vehicle 10.

As seen in FIG. 6, the detachable hammer tool 30 includes a weighted or steel reinforced bar at the upper end thereof having a hammer head 34 shown with a sharp tip 36 made of hardened metal that may be used to forcibly contact a glass window to break the window. The steel reinforced bar provides weight at the hammer head 34. The steel reinforced bar may be extended to telescope outward from the handle body 32 to provide increased leverage for swinging the hammer head 34.

The detachable hammer tool 30 further includes the cutter 38 shown at one end according to one example. The cutter 38 may include a sharp blade positioned to receive fabric, such as seat belt material, to cut the fabric when necessary. Using the hammer tool 30, a passenger may remove a seat belt if needed with the cutter 38.

The detachable hammer tool 30 includes a circuit board 44, such as a printed circuit board, shown located on the steel reinforced bar proximate to the hammer head 34. The circuit board 44 may include a controller and other control circuitry. Included in the control circuitry is an accelerometer sensor 46 for measuring acceleration and deceleration of the hammer head 34 when the hammer tool 30 is forcibly swung and contacts a glass window surface. The accelerometer sensor 46 generates a signature signal based on the sensed acceleration and deceleration. The sensed acceleration signal may be monitored to determine whether the hammer tool 30 is contacting a glass surface in a use situation. In addition, the control circuitry further includes a radio frequency (RF) signal communication device 40 such as an RF signal transmitter. The RF signal transmitter may be used to monitor the location of the detachable hammer tool 30 such as whether the detachable hammer tool 30 is located within the cabin interior 22 of the vehicle 10 or outside of the vehicle 10. In the event that the detachable hammer tool 30 is determined to be located outside of the vehicle 10, certain actions including generating an alert signal may be ignored. Whereas if the hammer tool 30 is determined to be located within the vehicle 10, the hammer tool 30 may be presumed to be in use if the acceleration signal indicates that the hammer head is contacting a glass surface and an alert signal may be generated.

Referring back to FIG. 2, the vehicle 10 is configured to include a plurality of first RF signal communication devices shown and described in one embodiment as a plurality of RF receivers 90A-90E positioned at different locations on board the vehicle 10. In the example shown, the vehicle 10 is equipped with five (5) RF receivers 90A-90E, however, it should be appreciated that any number of RF receivers may be employed. The RF receivers 90A-90E each may receive RF signals transmitted by one or more RF transmitters including the RF transmitter 40 located on the hammer tool 30. The RF receivers 90A-90E may be configured as RF transceivers which may allow for the transmission and reception of RF signals. As such, RF transceivers may receive the RF transmit signals from the RF transmitter 40 and may further transmit signals to other communication devices on-board or off-board the vehicle 10.

The RF transmitter 40 may be configured as an RF transceiver that both transmits and receives RF signals. The RF transmitter 84 may use Bluetooth® low energy (BLE) commonly operating in 2.4 GHz ISM band (Industrial Scientific and Medical) and used for wireless personal area networks, according to one example. According to another example, the RF transmitter 40 may use an Ultra Wide-Band (UWB) protocol which may operate in the 6-8 GHz band. With both BLE and UWB, the system may employ the use of Round-Trip Time (RTT) Time of Flight (ToF) to establish the hammer tool location through triangulation or other methods such as Angle-of-Arrival (AoA), Received Signal Strength Indication (RSSI), Phase or other methods. Further, other technologies may be used such as low frequency (i.e., 125-134 kHz) RSSI or acoustic or ultrasonic sound.

As seen in FIGS. 2 and 6, a second RF signal communication device embodied as an RF transmitter 84 is located on the hammer tool 30 and transmits a low energy RF signal that may be received by each of the five RF receivers 90A-90E. RF receiver 90A is shown located at a position generally at the forward end of the cabin interior 14, RF receivers 90B and 90C are shown located on opposite left and right lateral sides of the front row of seating, and RF receivers 90D and 90E are shown located on opposite left and right lateral sides of the second row of seating. As such, each of the RF receivers 90A-90E is located in a different location separated from the other RF receivers 90A-90E. The RF signal transmitted from the RF transmitter 40 is received by each of the RF receivers 90A-90E and is processed to determine a location of the hammer tool 30. According to one embodiment, this may be achieved by processing the received signal strength or amplitude of the RF signal received at each of the RF receivers 90A-90E and determining via triangulation a geographic location of the hammer tool 30. By determining the amplitude of the RF signal received by each RF receivers 90A-90E, the distance from each RF receiver to the RF transmitter can be determined. Given the relative location to each RF receiver, the location of the RF transmitter transmitting the processed signal can be determined using triangulation.

Figure 3:
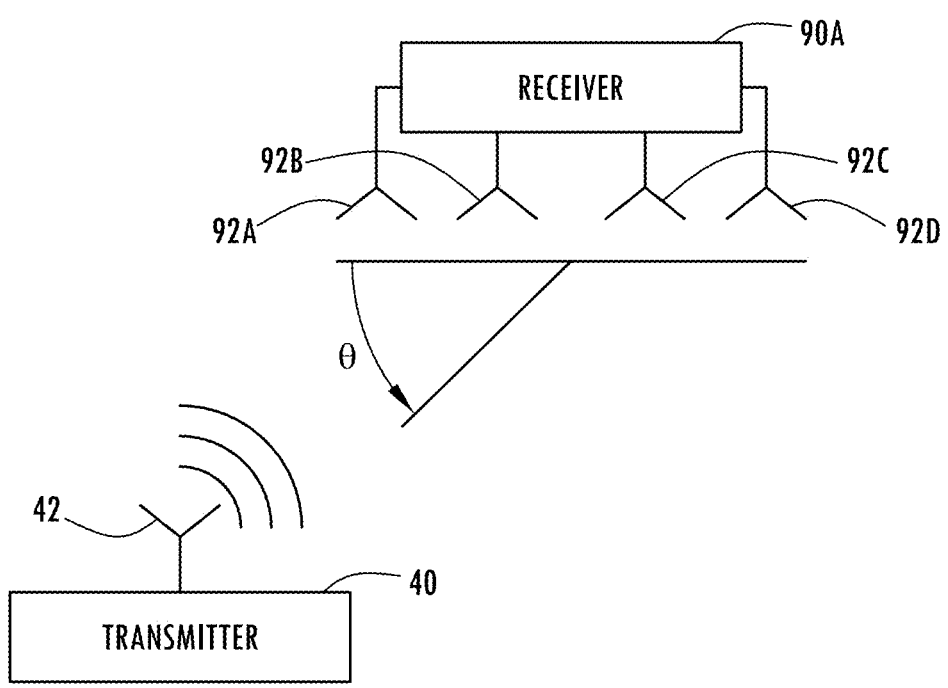
FIG. 3 is a schematic view of an RF signal transmitting communicating with an RF signal receiver to track location of the hammer tool, according to one example.

According to another embodiment, the RF receivers 90A-90E may include a plurality of antennas that further enable determination of an approximate angle θ of arrival as shown in FIG. 3 to provide enhanced accuracy determination to the location of the RF transmitter 40 associated with the hammer assembly 36. In this embodiment, RF receiver 90A is shown having a plurality of antennas, shown as four antennas 92A-92D for receiving an RF signal transmit from the RF transmitter 40 with antenna 42 and determining an angle θ of arrival of the signal based on the arrangement of the plurality of antennas 92A-92D. The amplitude of the signal received at each of the RF receivers 90A-90E may further be processed to determine distance to each RF receivers and to determine an accurate position of the RF transmitter by using triangulation. RF receivers 90B-90E may likewise be configured as shown in FIG. 3. According to a further embodiment, the location of the RF transmitter may be determined based on a determined roundtrip time of flight.

As such, the hammer tool 30 may be monitored and the location of the RF transmitter 40 on the hammer tool 30 determined by processing the RF signal received with the RF receivers 90A-90E with a controller. The determined location of the hammer tool 30 may be used to determine whether to issue an alert signal output. For example, an alert signal output may be generated only if the hammer tool 30 is determined to be located in the vehicle 10. The driver and passengers in the vehicle 10 may be notified of the location of the hammer tool 30 on a human machine interface (HMI), such as a vehicle display screen 20. The determined location of the hammer tool 30 may be used to control various other functions on board the vehicle 10.

The RF transmitter 40 may include an antenna 42, RF circuitry, and an electrical power source in the form of a battery 52. The vehicle 10 may provide a low battery output signal to indicate when the battery 52 is running low so that the battery may be replaced. Alternatively, the first RF signal communication devices may be configured as transceivers that may be used as power sources from which a battery-less transceiver on the hammer tool 30 can harvest energy and then act as a transponder thus ensuring the hammer tool monitoring may operate without a battery. This may be achieved by harvesting energy from the RF signal received by the antenna with a blocking diode that charges one or more capacitors. While the RF transmitter 40 is shown located on the hammer head 34, it should be appreciated that the RF transmitter 40 may be located elsewhere on the hammer tool 30 or an accessory associated with the hammer tool 30 to provide a signal used to identify the location of the hammer tool 30.

The RF transmitter 40 may be configured to only transmit when located in a vehicle or to transmit at a higher transmission rate when in a vehicle, so as to consume less battery power. The RF transmitter 40 can remain in a dormant state and can be prompted to an active state by the vehicle or may transmit signals only on request so as to further conserve the battery power. For example, with the RF transmitter 40 configured as an RF transceiver, the RF transceiver may receive a signal prompting the RF transmitter portion of the transceiver to transmit signals upon request and may otherwise remain in the dormant state to thereby conserve battery power.

While the second RF signal communication device in the form of the RF transmitter 40 is shown located on a detachable hammer tool 30 and the first RF signal communication devices in the form of the RF receivers 90A-90E are located on the vehicle 10, it should be appreciated that the RF transmitter 40 may be configured as an RF transceiver that may be located on either the detachable hammer tool 30 or the vehicle 10 and the plurality of RF receivers 90A-90E may be located on the other of the detachable hammer tool 30 and the vehicle 10, according to further embodiments.

Figure 7:
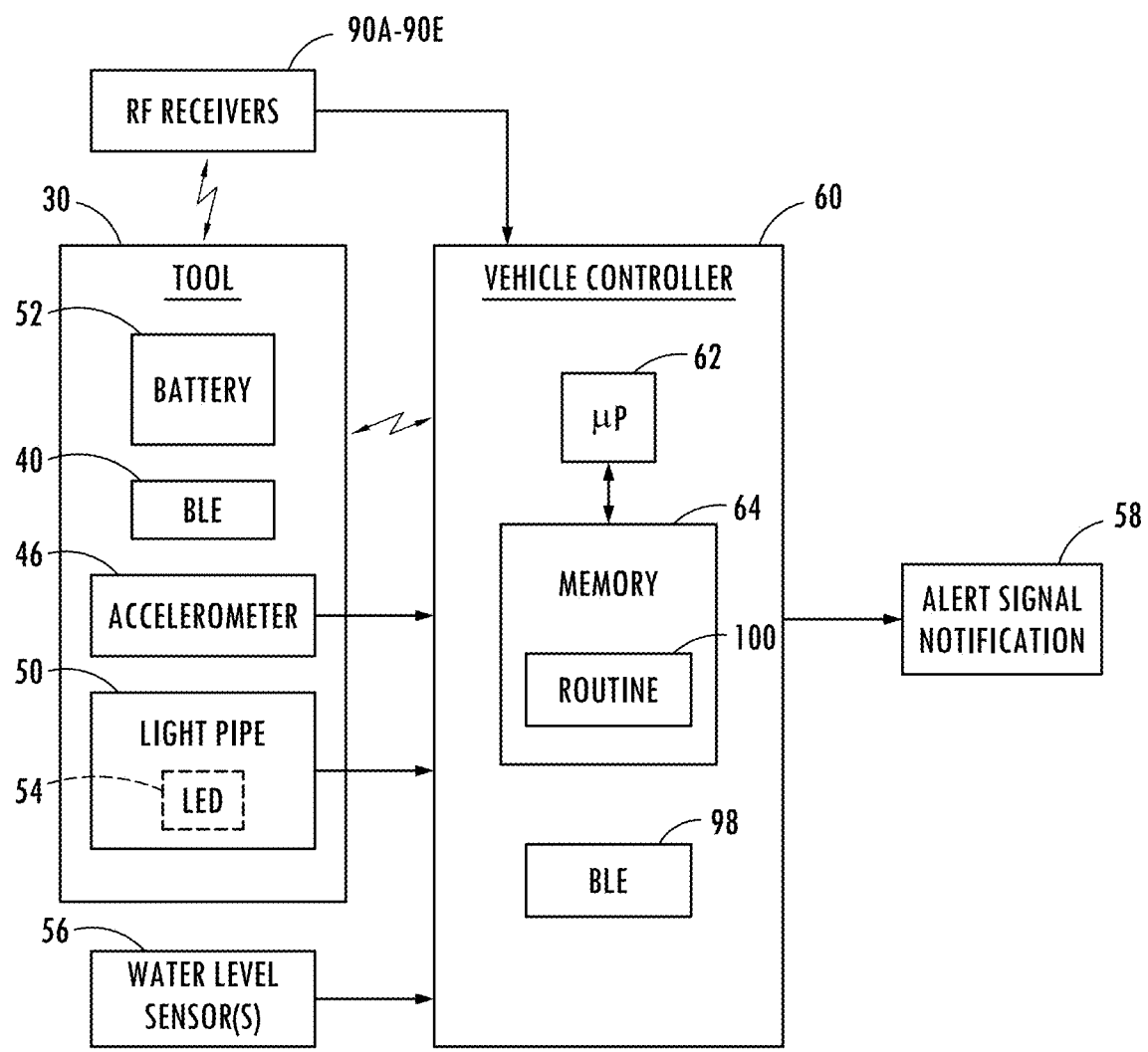
FIG. 7 is a block diagram illustrating a controller configured for providing an alert output based on sensed position and usage of the hammer tool.

Referring to FIG. 7, a vehicle controller 100 is shown for receiving various inputs and controlling various outputs depending upon the sensed location of the detachable hammer tool 30. The controller 60 may be located on the vehicle and may be configured as a microcontrol unit (MCU) have a microprocessor 62 and memory 64. It should be appreciated that any analog and/or digital control circuitry may be employed as the controller 60. Stored within memory 64 and executed by microprocessor 62 are one or more control routines 100. Additionally, the controller 100 is shown having a wireless communication device 98, such as a Bluetooth® low energy device (BLE). The controller 60 receives various inputs made available on the vehicle including received RF signals from the RF signal receivers 90A-90E which may be processed and determine the location of the detachable hammer tool 30 by communicating via the RF transmitter 40 using signal triangulation. Further, the controller 60 receives a signal from the water level sensor 56 indicating the water level subjected to the vehicle 10 and whether the vehicle 10 is likely at least partially submerged in water. Further, the vehicle controller 60 communicates with the detachable hammer tool 30 to receive the accelerometer signal from the accelerometer 46. The controller 60 processes the accelerometer signal and the water level sensor signal and determines the location of the detachable hammer tool 30 from the RF signal receivers 90A-90E and determines an actions to take in response thereto.

When the vehicle controller 60 determines that the water level sensor signal indicates that the vehicle is submerged in water, the vehicle controller 60 communicates with the detachable hammer tool 30 to turn on the LED 54 to illuminate the light pipe 50 on the handle of the hammer tool 30 such that passengers in the vehicle 10 will readily identify the hammer tool 30. A user may then remove the hammer tool 30 from the assist handle assembly 80 and utilize the hammer tool 30 to break a glass window to exit the vehicle and may further use the cutter on the hammer tool 30 to cut a seat belt or other material to free the passenger from the seat of the vehicle, if necessary. When the vehicle controller 60 determines that the hammer tool 30 is contacting a hard object such as a glass window via the accelerometer signal, and determines that the detachable hammer tool 30 is located within the cabin interior of the vehicle 10, and that the vehicle 10 is located in water of a minimum depth, the vehicle controller 60 may generator one or more alert signal outputs 58. The alert signal outputs 58 may include transmitting via cellular a communication signal for assistance, such as a 911 call to provide the alert signal and location information such as GPS location. Other actions may include actuating one or more windows from the closed position to the open position.

Figure 8:
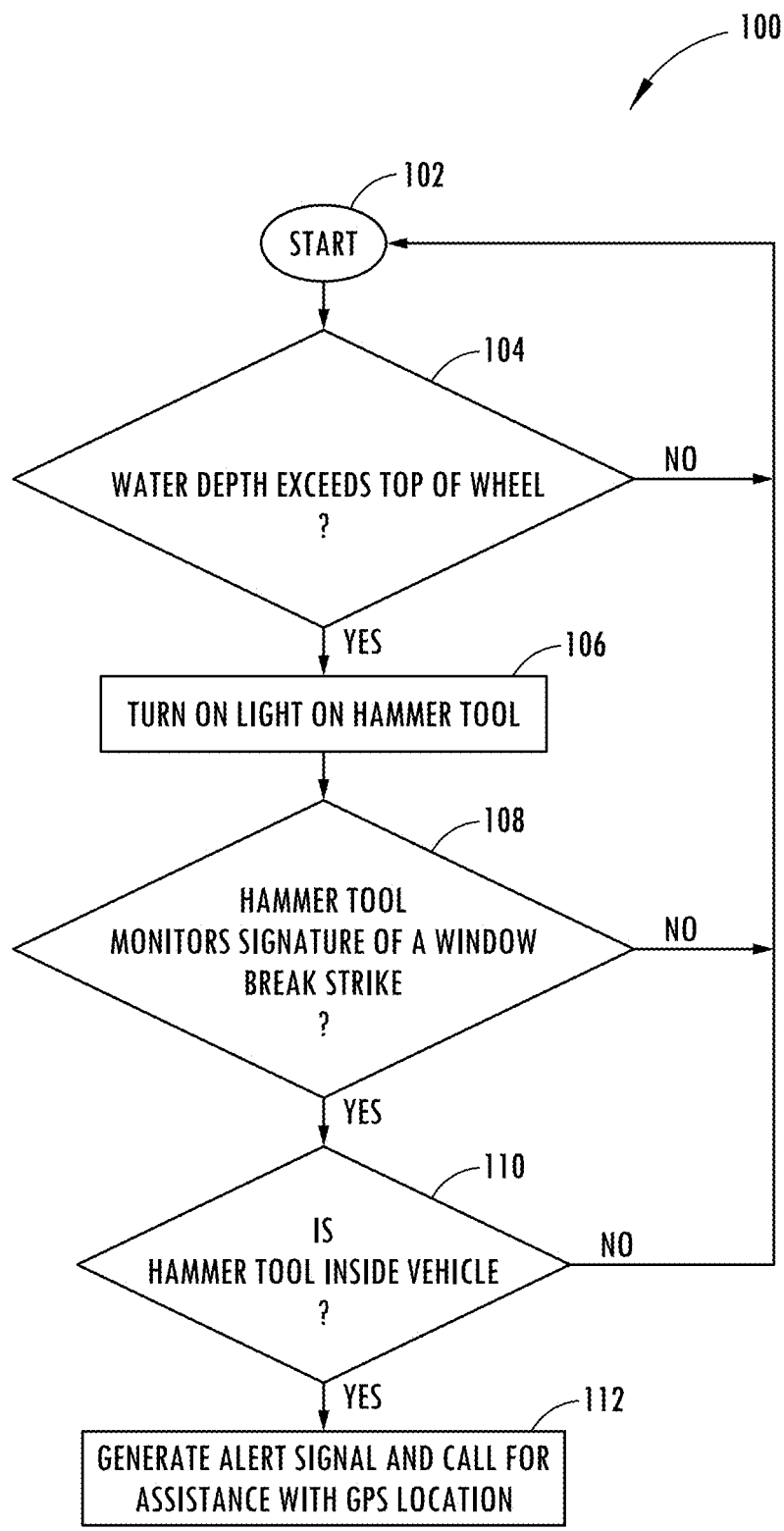
FIG. 8 is a flow diagram illustrating a control routine for controlling the alert output based on the monitored position and usage of the hammer tool.

Referring to FIG. 8, the routine 100 for monitoring the hammer tool 30 and vehicle 10 and generating an alert signal output is illustrated according to one embodiment. Routine 100 begins at step 102 and proceeds to decision step 104 to determine if a water depth exceeds the top of the vehicle wheel and if not, returns to step 102. If the water depth exceeds the top of the vehicle wheel, routine 100 proceeds to step 106 to turn on the light pipe on the hammer tool. Next, at decision step 108, a controller monitors a signal signature of the accelerometer to determine if the signal signature is indicative of a window break strike. If the monitored signal signature is not indicative of a window break strike, routine 100 proceeds back to step 102. If the monitored signal signature indicates a window break strike, routine 100 proceeds to decision step 110 to determine if the hammer tool is located inside the vehicle cabin. If the hammer tool is not located in the vehicle cabin, routine 100 returns to step 102. If the hammer tool is determined to be located inside the vehicle, routine 100 proceeds to step 112 to generate the alert signal and to make a cellular call to a service center for assistance to transmit the alert signal output with GPS location information.

Accordingly, the hammer tool 30 advantageously may be used on a vehicle 10 to break a glass window and provide assistance to the vehicle passengers by issuing an alert signal output when the hammer tool 30 is determined to be used within the cabin interior and the vehicle is submerged in water.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A window breaker tool for use on a vehicle, the vehicle having a plurality of RF signal communication devices, the tool comprising:
   a body having a handle to enable a user to grip the tool;
   a window breaker member extending from the handle configured to impact a glass window with force to break the glass window;
   an accelerometer operatively coupled to the body to sense acceleration during the impact and generate a signature signal; and
   an RF signal communication device located on the tool for communicating with the plurality of RF signal communication devices on the vehicle to determine a location of the tool relative to the vehicle, wherein the RF signal communication device communicates with a controller for processing the signature signal and determining whether the signature signal is indicative of the tool in use to break a window, wherein the controller further determines the tool is within the vehicle based on the location and outputs an alert signal, wherein the tool is attached to the vehicle to form an assist handle on the vehicle, wherein the tool has a first connector at a first end and a second connector at a second end, wherein the first and second connectors are releasably connected to supporting portions of the vehicle and wherein the tool comprises a release button to enable a user to remove the tool from the supporting portions.

2. The tool of claim 1, wherein the controller is located on the vehicle.

3. The tool of claim 2, wherein the RF signal communication device comprises an RF transmitter and wherein the plurality of RF signal communication device on the vehicle comprise RF receivers, and wherein the controller processes the signals received with the RF receivers and determines the location of the tool based on the received RF signals.

4. The tool of claim 1, wherein the tool further comprises a battery.

5. The tool of claim 1, wherein the tool further comprises a lighting device, wherein the lighting device is illuminated when the controller determines that the vehicle is located in a body of water.

6. The tool of claim 5, wherein the body of water is determined based on a water sensor provided on the vehicle.

7. The tool of claim 6, wherein the water sensor comprises one or more capacitive sensors.

8. The tool of claim 1, wherein the handle serves as the assist handle.

9. The tool of claim 1, wherein the alert signal is transmitted to a service center.

10. The tool of claim 1, wherein the tool further comprises a cutter.

11. A window breaker tool for use on vehicle, the vehicle having a plurality of RF signal communication devices, the tool comprising:
    a body having a handle to enable a user to grip the tool;
    a window breaker member extending from the handle configured to impact a glass window with force to break the glass window;
    an accelerometer operatively coupled to the body to sense acceleration during the impact and generate a signature signal; and
    an RF signal communication device located on the tool for communicating with a plurality of RF signal communication devices on a vehicle to determine a location of the tool relative to the vehicle, wherein the RF signal communication device communicates with a controller for processing the signature signal and determining whether the signature signal is indicative of the tool in use to break a window, wherein the controller further determines the tool is within the vehicle and outputs an alarm signal when the tool is in use in the vehicle and the vehicle is determined to be in a body of water, wherein the tool is attached to the vehicle to form an assist handle on the vehicle, wherein the tool has a first connector at a first end and a second connector at a second end, wherein the first and second connectors are releasably connected to supporting portions of the vehicle and wherein the tool comprises a release button to enable a user to remove the tool from the supporting portions.

12. The tool of claim 11, wherein the controller is located on the vehicle.

13. The tool of claim 12, wherein the RF signal communication device comprises an RF transmitter and wherein the plurality of RF signal communication device on the vehicle comprise RF receivers, and wherein the controller processes the signals received with the RF receivers and determines the location of the tool based on the received RF signals.

14. The tool of claim 11, wherein the tool further comprises a battery.

15. The tool of claim 11, wherein the body of water is determined based on a water sensor provided on the vehicle.

16. The tool of claim 15, wherein the tool further comprises a lighting device, wherein the lighting device is illuminated when the controller determines that the vehicle is located in the body of water.

17. The tool of claim 11, wherein the tool further comprises a cutter.

* * * * *